United States Patent
Van Rossum et al.

(10) Patent No.: US 10,956,104 B2
(45) Date of Patent: Mar. 23, 2021

(54) CONTROLLER FOR A MULTI-ROLL PRINTER, PRINTING SYSTEM AND METHOD FOR CONTROLLING A MULTI-ROLL PRINTER

(71) Applicant: CANON PRODUCTION PRINTING HOLDING B.V., Venlo (NL)

(72) Inventors: Elsemieke P. A. Van Rossum, Venlo (NL); Eduardus J. W. Van Vliembergen, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/846,776

(22) Filed: Apr. 13, 2020

(65) Prior Publication Data

US 2020/0241815 A1 Jul. 30, 2020

Related U.S. Application Data

(63) Continuation of application No. PCT/EP2018/078428, filed on Oct. 17, 2018.

(30) Foreign Application Priority Data

Oct. 27, 2017 (EP) .................................... 17199002

(51) Int. Cl.
*G06F 15/00* (2006.01)
*G06K 1/00* (2006.01)
(Continued)

(52) U.S. Cl.
CPC .......... *G06F 3/1251* (2013.01); *G06F 3/0486* (2013.01); *G06F 3/04817* (2013.01); *G06F 3/1205* (2013.01); *G06F 3/1253* (2013.01)

(58) Field of Classification Search
CPC .. G06F 3/1251; G06F 3/04817; G06F 3/0486; G06F 3/1205; G06F 3/1253
(Continued)

(56) References Cited

U.S. PATENT DOCUMENTS

| | | | |
|---|---|---|---|
| 2003/0026634 A1* | 2/2003 | Uehara | H04N 1/32545 400/61 |
| 2004/0012817 A1* | 1/2004 | Brewington | H04N 1/4076 358/3.06 |

(Continued)

FOREIGN PATENT DOCUMENTS

EP 3 217 640 A1 9/2017

OTHER PUBLICATIONS

European Search Report, issued in Application No. 17 19 9002, dated Apr. 12, 2018.
(Continued)

*Primary Examiner* — Douglas Q Tran
(74) *Attorney, Agent, or Firm* — Birch, Stewart, Kolasch & Birch, LLP

(57) ABSTRACT

A controller for a multi-roll printer, a printing system with such a printer and such a controller and a method for controlling such a printer are provided. A user may assign print jobs directly to one of the rolls by assigning graphical representations the print jobs to regions corresponding to those rolls in a GUI. The user may also assign print jobs to a region in the GUI that is not associated with any particular roll, as a result of which each image of said print job is individually assigned automatically to at least one of the rolls.

15 Claims, 6 Drawing Sheets

(51) Int. Cl.
*H04N 1/00* (2006.01)
*G06F 3/12* (2006.01)
*G06F 3/0481* (2013.01)
*G06F 3/0486* (2013.01)

(58) Field of Classification Search
USPC .................................. 358/1.6, 1.1, 1.13, 1.15
See application file for complete search history.

(56) References Cited

U.S. PATENT DOCUMENTS

| | | |
|---|---|---|
| 2007/0060506 A1 | 3/2007 | Walsh et al. |
| 2008/0180725 A1 | 7/2008 | Levin |
| 2015/0093049 A1 | 4/2015 | Roumier et al. |
| 2017/0262242 A1* | 9/2017 | Van Vliembergen ........................ H04N 1/00461 |

OTHER PUBLICATIONS

International Search Report, issued in PCT/EP2018/078428, dated Dec. 5, 2018.
Written Opinion of the International Searching Authority, issued in PCT/EP2018/078428, dated Dec. 5, 2018.

* cited by examiner

CONTROLLER FOR A MULTI-ROLL PRINTER, PRINTING SYSTEM AND METHOD FOR CONTROLLING A MULTI-ROLL PRINTER

CROSS REFERENCE TO RELATED APPLICATIONS

This application is a Continuation of PCT International Application No. PCT/EP2018/078428, filed on Oct. 17, 2018, which claims priority under 35 U.S.C. 119(a) to patent application Ser. No. 17/199,002.1, filed in Europe on Oct. 27, 2017, all of which are hereby expressly incorporated by reference into the present application.

FIELD OF THE INVENTION

The present invention generally pertains to a controller for a multi-roll printer such as a dual-roll printer. The invention further pertains to a printing system and to a method for controlling a multi-roll printer or a printing system.

BACKGROUND ART

Roll printers are a well-known type of printers. In roll printers, a recording medium such as paper is, for example, wound up on an input roll and then fed into, and guided along, a path through the printer, unwinding the input roll by and by along the process. In this way, the recording medium is roll-fed (i.e. taken from a roll and fed) to a marking unit of the printer which applies a marking material (prints) onto the recording medium. Such printers are therefore also called roll-fed printers.

Roll-to-roll printers are a common type of roll printers and are characterized in that the recording medium is, after images have been printed on it, wound up on an output holder of an output roll by and by along the process.

In a multi-roll printer, more than one such roll of the recording medium is processed at the same time. For example, in a dual-roll printer, a first and a second roll are processed at the same time. The two rolls may process the recording medium with different speeds; usually, however, the two speeds are at least close to each other. One and the same controller may be used to control the processing of several, in particular the printing on several, rolls.

In some known controllers for a printer, print jobs are assigned to a printer using a graphical user interface, or GUI for short. US 2008/180 725 A1 describes a method for generating user-defined printer cluster groups for the automatic distribution of documents for printing, using a GUI.

One common mechanism is the drag-and-drop mechanism: The user performs a mouse click on a graphical representation of a print job and holds the mouse button down. While holding the mouse button down, the user moves the mouse and thus drags the graphical representation of the print job along the GUI until the graphical representation of the print job is positioned over a graphical representation of a drop zone. By releasing the mouse button when the graphical representation hovers over the drop zone, the graphical representation is dropped onto the drop zone. Of course, a drag-and-drop function may be performed also without the use of a computer mouse.

For example, touching a touch screen with a finger over a graphical representation may be interpreted in the same way as a mouse click, drawing with the finger over the touch screen while maintaining contact may be interpreted as dragging the graphical representation, and releasing the finger from the graphical representation when the graphical representation is located over the drop zone may be interpreted as dropping the graphical representation onto the drop zone.

A drop zone is a region of the GUI that is functionally connected to a specific function to be applied to the object that is dragged and dropped onto the drop zone. In the case of a printer controller, the GUI may be configured such that the print job whose graphical representation has been dropped onto the drop zone is then queued for printing by the printer. An example for such a drop zone is the printer queue window of a commonly used computer operating system using application windows. Any graphical representation of a printable file may be dragged and dropped into a window representing the printer queue, as a result of which the printable file is added to the printer queue of a printer connected to, and controlled by, the computer operating system.

The more rolls a roll-to-roll printer comprises, the more confusing such GUI may become, and the more difficult the controlling of the printer may become.

It is desirable to have a method for controlling a roll-to-roll printer that gives a user, or operator, full control over the assignments of different print jobs to different rolls while at the same time simplifying the controlling as much as possible. This is in particular desirable when the printer imposes preconditions to be met for the print jobs which are planned to be printed next to each other.

SUMMARY OF THE INVENTION

In a first aspect of the present invention, a controller for a multi-roll printer configured to print on at least a first roll of a medium and a second roll of a medium is provided. It should be understood that the multi-roll printer may comprise more than two rolls, i.e. more than two processing paths for rolls of recording medium, and that all explanations and discussions presented in the following that refer to two rolls, or to a first and a second roll, may equally be applied to three or more rolls.

The multi-roll printer may have multiple input rolls and, as output, for example:
  one output roll;
  multiple output rolls;
  a free fall output (without wrapping, or rolling, up);
  cut sheets as output (e.g. with a cutter provided just after the print head);
  or the like.

The multi-roll printers may have multiple output rolls and, as input, for example:
  one input roll and a (length or breadth) cutter just after the print head;
  one input roll and one length-cutter before or after a print head; or
  multiple input rolls;
  or the like.

Preferably, the multi-roll printer is a multi-roll roll-fed printer, especially preferably a multi-roll roll-to-roll printer.

The controller comprises a data interface receiving, or configured to receive, print jobs to be executed (specifically: printed) by the multi-roll printer, each print job comprising at least one image to be printed. Often print jobs comprise more than one image and/or additional printing parameters. For example, one print job could comprise an image that is to be printed ten times and, as additional printing parameters, the instruction that the images are to be printed with a certain high resolution.

The controller also comprises a display configured to display a GUI with graphical representations of the print jobs received by the data interface, wherein a first region, a second region and a third region are defined within the GUI. The controller further comprises a user interface which allows a user, or operator, to assign the graphical representation of any print job of the received print jobs to any one of the first, second and third region of the GUI.

The controller additionally comprises an assignment logic configured to assign all images of a print job to the first roll when the respective graphical representation of that print job is assigned by the user to the first region and to assign all images of a print job to the second roll when the respective graphical representation of that print job is assigned by the user to the second region.

It should be understood that, when it is recited that a print job, or an image, is assigned to one of the rolls of the multi-roll printer, this means that it is determined and controlled that said print job, or image, is printed by the printer onto that roll. Since each roll of a multi-roll printer is typically processed (for example, moved, marked, cut, and so on) by a separate roll processing path of the printer, the assignment of a print job, or image, to a roll may also be interpreted as the assignment of that print job, or image, to a certain roll processing path, or to a certain roll processing path portion.

The assignment logic is further configured to determine, for each image of a print job assigned to the third region by the user, at least one of the rolls of the multi-roll printer and to assign each image to the respective roll chosen for that image. For example, when the multi-roll printer is a dual-roll printer, then the assignment logic will, for each image of a print job assigned to the third region, determine the first of the two rolls and/or the second of the two rolls. In some embodiments, only a single one of the rolls will be determined for each individual image. The determining of a roll for each image of the print job may be based on at least one criterion selected by the user.

In other words, the first, second and third region are defined, respectively, as a first drop zone, a second drop zone and a third drop zone.

The assignment logic may be implemented as pure hardware, i.e. comprising transistors, logic gates and other circuitry. Additionally, the assignment logic may be partially realized in terms of software. As such, the assignment logic may comprise a processor and a memory storing a software or a firmware that is executed by the processor. Signals may be received by an input interface of the assignment logic and signals that the processor of the assignment logic creates may be outputted by an output interface of the assignment logic. The assignment logic may be implemented as a microcontroller, an ASIC, an FPGA and so on.

The assigning of print jobs to rolls may be performed by the assignment logic outputting an output signal to the roll-to-roll printer which instructs the roll-to-roll printer to print that print job onto that roll of the recording medium, or, in other words, to process that print job using the roll processing path that handles that roll of the recording medium.

The term "printing" is used herein as a general term for any marking of a recording medium with any marking material. As a synonym, the term "image forming" may be used. Recording mediums may comprise paper, flexible plastic, metal foils, textiles and so on. Marking materials may comprise ink, metal, varnish, toner and so on. "Marking" may be any process by which the marking material is applied to the recording medium.

Preferably, the roll-to-roll printer is a roll-to-roll inkjet printer, i.e. a roll-to-roll printer in which ink is used as a marking material.

The described controller has, among others, the advantage that a user, or operator, is able to specifically decide which roll (or, equivalently, which roll processing path) should receive a specific print job e.g. by dragging the graphical representation of that print job specifically to the region representing that roll and dropping the graphical representation of the print job in that region.

On the other hand, if the user does not know to which roll the print job should be assigned, or does not want to decide, or is not qualified enough to decide, then the user may drag the graphical representation of the print job to the third region, following which the assignment logic determines at least one of the rolls, or exactly one of the rolls, of the roll-to-roll printer for each image of the print job and assigns the images to the respective chosen rolls.

One immediate benefit is that, for example when a large number of images is comprised by a print job, the assignment logic may distribute said images as evenly as possible, or as evenly as allowed given the criteria on which the determining by the assignment logic is based, over the rolls of the multi-roll printer.

When a print job comprises images with different requirements, not all of which can be met by all of the rolls of the multi-roll printer, the assignment logic may automatically and correctly assign all of the images to at least one of the rolls that is able to meet the respective requirements. For example, only one of the roll processing paths may be provided with a printing device that is capable of marking its roll with a certain metallic ink. In this case, all images of a print job assigned to the third region which require marking using said metallic ink may be assigned to that roll processing path.

The invention also provides, according to a second aspect, a printing system comprising a multi-roll printer and a controller according to the first aspect for said multi-roll printer.

Furthermore, the invention provides, according to a third aspect, a method for controlling a multi-roll printer configured to print on at least a first roll of a medium and a second roll of a medium, the method comprising the steps of:

receiving print jobs to be executed by the multi-roll printer, each print job comprising at least one image to be printed;

displaying a GUI with graphical representations of the received print jobs;

defining a first region, a second region and a third region of the GUI;

assigning, by a user, the graphical representations of at least one print job to any one of the first, second and third region of the GUI;

assigning all images of a print job automatically to the first roll when the respective graphical representation of that print job has been assigned by the user to the first region;

assigning all images of a print job to the second roll when the respective graphical representation of that print job has been assigned by the user to the second region; and determining automatically, for each image of a print job whose graphical representation has been assigned to the third region by the user, at least one of the rolls of the multi-roll printer;

assigning each image of the print job assigned to the third region by the user to the respective at least one roll determined for that image; and printing each image of each print job onto the respective roll to which said image has been assigned.

Preferably, the method is used to control a multi-roll roll-fed printer, especially preferably a multi-roll roll-to-roll printer.

The invention also provides, according to a fourth aspect, a software medium comprising executable program code configured to, when executed, perform the method according to the third aspect.

The method according to the third aspect and the software medium according to the fourth aspect offer, among others, the same advantages as have been described with respect to the controller according to the first aspect.

Additional advantages, and the solution of additional problems, will be apparent from the subject-matter of the dependent claims as well as from the description and the drawings.

In some advantageous embodiments, the user interface allows a user to move the graphical representations of the print jobs within the GUI. In other words, the user interface allows the user to drag the graphical representations of the print jobs. The user interface is configured to assign a print job to the first region when the graphical representation of that print job is dragged to and dropped onto the first region, to assign a print job to the second region when the graphical representation of that print job is dragged to and dropped onto the second region, and to assign a print job to the third region when the graphical representation of that print job is dragged to and dropped onto the third region. In this way, a simple yet efficient and precise way to assign the print jobs to different regions is provided.

In some advantageous embodiments, the display is configured to change the appearance of the first region when the graphical representation of a print job is dragged onto, or moved over, or brought into contact with, the first region, to change the appearance of the second region when the graphical representation of a print job is dragged onto, or moved over, or brought into contact with, the second region and/or to change the appearance of the third region when the graphical representation of a print job is dragged onto, or moved over, or brought into contact with, the third region. Accordingly, the user or operator is provided with immediate feedback about the consequences of dragging and dropping the graphical representation of a print job to a specific region in a simple yet clear way.

In some advantageous embodiments, the display is configured to graphically indicate the third region in the GUI to the user only when the graphical representation of a print job is dragged onto, or moved over, or brought into contact with, the third region of the GUI.

In some advantageous embodiments, the display is configured to display the GUI such that the third region is arranged between the first and the second region.

In some advantageous embodiments, the display is configured to indicate both the first and the second region to the user in the GUI when the graphical representation of a print job is dragged onto, or moved over, or brought into contact with, the third region of the GUI.

In some advantageous embodiments, the assignment logic is configured to choose for each image one of the rolls of the multi-roll printer based on data comprised in the print job to which the image belongs and/or based on properties of the rolls of the multi-roll printer.

In some advantageous embodiments of the method according to the third aspect, a print job is assigned:

to the first region when the graphical representation of that print job is dragged to and dropped onto the first region, to the second region when the graphical representation of that print job is dragged to and dropped onto the second region, and to the third region when the graphical representation of that print job is dragged to and dropped onto the third region.

In this way, a simple yet precise way to assign the print jobs to different regions is provided.

In some advantageous embodiments of the method, the appearance of the first region is changed when the graphical representation of a print job is dragged onto, or moved over, or brought into contact with, the first region, the appearance of the second region is changed when the graphical representation of a print job is dragged onto, or moved over, or brought into contact with, the second region and/or the appearance of the third region is changed when the graphical representation of a print job is dragged onto, or moved over, or brought into contact with, the third region. Accordingly, the user or operator is provided with immediate feedback about the consequences of dragging and dropping the graphical representation of a print job to a specific region in a simple yet clear way.

In some advantageous embodiments, the third region in the GUI is graphically indicated to the user only when the graphical representation of a print job is dragged onto the third region of the GUI.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF THE DRAWINGS

Figure 1:
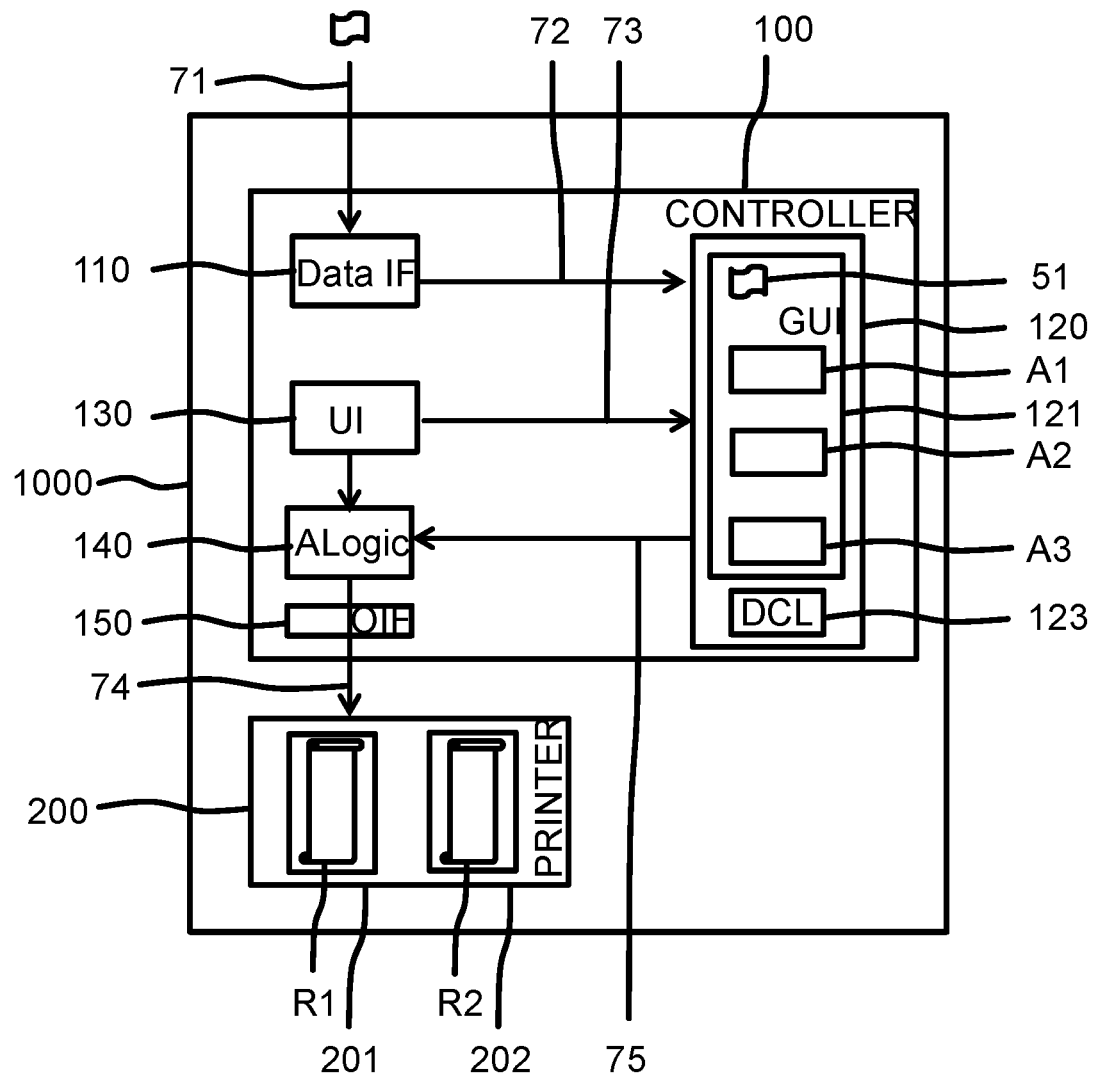
FIG. 1 shows a schematic block diagram depicting a printing system according to an embodiment of the second aspect comprising a controller according to an embodiment of the first aspect.

The present invention will now be described with reference to the accompanying drawings, wherein the same reference numerals have been used to identify the same or similar elements throughout the several views, and in some instances throughout the several embodiments.

FIG. 1 shows a schematic block diagram depicting a printing system 1000 according to an embodiment of the second aspect. The printing system 1000 comprises a multi-roll printer 200 and a controller 100 for the multi-roll printer 200, wherein the controller 100 is an embodiment of the first aspect. As an example, the roll-to-roll printer 200 will be described as a dual-roll roll-to-roll printer configured to process a first roll R1 of a first recording medium and a second roll R2 of a second recording medium. In other words, the roll-to-roll printer is described as comprising a first roll processing path 201 for processing the first roll R1, and a second roll processing path 202 for processing the second roll R1. The two recording media may be the same, or may be different.

However, as has been mentioned before, the multi-roll printer 200 may also be configured to process more than two rolls, and may, accordingly, comprise three or more roll processing paths. The multi-roll printer 200 may be a roll-fed printer, a roll-to-roll printer or may be of any other roll printer type, e.g. of a type that has a free fall output or the like.

Each roll processing path 201, 202 may comprise, apart from rollers such as driven rollers and idle rollers, its own printing device for marking (i.e., printing on) the respective roll R1, R2. Alternatively, one printing device—which usually comprises a plurality of individual print heads and/or a plurality of individual ink nozzles—may be configured and arranged to mark (i.e. print on) more than one, or even to mark all, rolls R1, R2 of the multi-roll printer 200.

The processing of the roll R1, R2 by the printer 200, specifically the printing, is controlled by the controller 100. The controller 100 may be integrated with a print controller as known in the art and thus provide additional functions that are usually provided by a print controller and which are not explicitly described herein.

The controller 100 comprises a data interface 110 that is configured to receive at least one print job. Specifically, the data interface 110 may be configured to receive an input data signal 71 describing, or comprising, at least one print job. For example, the input data signal 71 may be received from a non-volatile memory element such as a USB stick, or over a network. The input data signal 71 may originate also within the controller 100 itself, as will be described in the following.

The controller 100 also comprises a display 120 configured to display a graphical user interface 121, or GUI for short. Exemplary GUIs 121 in different exemplary states are shown in the following FIG. 2 through FIG. 7. The function of the controller 100 will also be explained with reference to reference signs shown in said FIGS. 2 through 7.

The display 120 is configured to display the GUI 121 with graphical representations 51, 52, 53, 54 (or: 51-54) of the at least one print jobs received by the data interface 110, preferably of all of the print jobs received by the data interface 110. The graphical representations 51-54 may, for example, comprise, or consist of, miniaturized versions of at least one image of each print job, for example a so-called "thumbnail". These graphical representations 51-54 are preferably based on data signals 72 received from the data interface 110 which indicate, or comprise, the miniaturized versions of the at least one image of each print job.

The display 120 may comprise a screen of a personal computer, or a screen integrated into the roll-to-roll printer 200 and/or into the controller 100. Apart from the screen itself, the display 120 may comprise a display controlling logic 123 that determines and controls the properties of the GUI 121 and how the GUI 121 is displayed by the display 120.

Within the GUI 121, a first region A1, a second region A2 and a third region A3 are defined. This defining of the regions A1-A3 may be performed by the display controlling logic 123.

The display controlling logic 123 may be realized in hardware, such as a circuit or a printed circuit board and/or comprising transistors, logic gates and other circuitry. Additionally, the display controlling logic 123 may be at least partially realized in terms of software. Accordingly, the display controlling logic 123 may comprise, or be operatively coupled to, a processor and a memory storing a software or a firmware that is executed by the processor to perform the functions of the display controlling logic 123.

Signals may be received by an input interface of the display controlling logic 123 and signals that the processor of the display controlling logic 123 creates may be outputted by an output interface of the display controlling logic 123. The display controlling logic 123 may be implemented, at least partially, as a microcontroller, an ASIC, an FPGA and so on.

Figure 2:
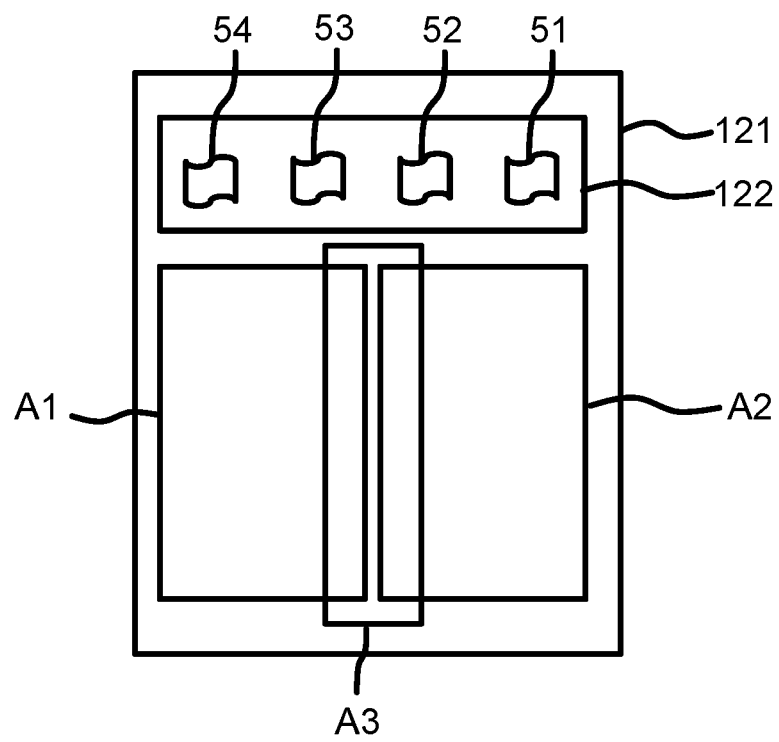
FIGS. 2-7 show schematically several exemplary views of a graphical user interface, GUI, for illustration of the functions of the printing system and the controller of FIG. 1.

In the example shown in FIG. 2, the graphical representations 51-54 of the print jobs are shown in a print job window 122 containing the print jobs, underneath which the three regions A1-A3 are defined. The first region A1 and the second region A2 are defined as adjacent to each other without overlapping. The first and the second region A1, A2 may touch, or may be arranged disjunct from one another. Preferably, the first region A1 and the second region A2 have the same geometrical shape. This indicates to the user that both the first region A1 and the second region A2 have the same functions and are operated in the same way, as will be described hereinbelow.

The third region A3 is defined as overlapping both the first region A1 and the second region A2 including a border line of each region A1, A2 that is closest to the respective other region A2, A1. In the exemplary case shown in FIG. 2, wherein the first and the second regions A1, A2 are defined as box-shaped, the third region A3 is also defined as box-shaped and as overlapping an edge of A1 closest to A2, as well as an edge of A2 closest to A1.

However, the third region A3 does not overlap either of the first or the second areas A1, A2 completely. In other words, there is a portion of the first region A1 that is not overlapped by the third region A3, and there is a portion of the second region A2 that is not overlapped by the third region A3.

Preferably, the area which the third region A3 encloses is smaller than either of the areas enclosed by the first region A1 and the second region A2.

It is also preferred that the third region A3 is substantially arranged between the first region A1 and the second region A2, for example as shown in FIG. 2. Alternatively, the third region A3 may be defined and arranged, e.g. by the display control logic 123, such in a space between the first region A1 and the second region A2 that the third region A3 does not overlap with either the first region A1 or the second region A2. In yet another variant, the display controlling logic 123 may be configured to define and arrange the third region A3 completely separate from the first region A1 and the second region A2, as illustrated with respect to FIG. 7.

Referring back to FIG. 1, the controller 100 also comprises a user interface 130 which allows the user to assign the graphical representation 51-54 of any print job of the received print jobs to any one of the first, second and third regions A1, A2, A3 of the GUI 121. The user does not necessarily have to assign the graphical representations 51-54 in the order in which they are arranged in the print job window 122 In fact, the controller 100 may be configured such that the user sets a priority order in which the print jobs are to be printed by the order in which the user assigns the print jobs to the first region A1, second region A2 and third region A3.

The user interface 130 may comprise a data input device such as a computer mouse, a joystick, or a keyboard. The data input device will output a user control signal 73 that is transmitted to the display 120 for controlling the GUI 121, e.g. by way of the display controlling logic 123. The user interface 130 may also be integrated with the display 120 in that the screen of the display 120 is realized as a touch-screen. In that case, the user control signal 73 will be an internal signal transmitted within the display 120.

Assigning one of the graphical representation 51-54 to one of the regions A1, A2 or A3 means that, in any conceivable way, the user has indicated the user's desire that the print job represented by the graphical representation 51-54 should be processed by a function of the controller 100, or of the roll-to-roll printer 200, associated with that specific region A1, A2, A3.

In the following, the function of the controller 100 will be described according to an embodiment in which the graphical representations 51-54 are dragged and dropped onto one of the regions A1, A2, A3 in order to assign said graphical representations 51-54 to the respective first, second or third region A1, A2 or A3. Accordingly, the user interface 130 will be assumed to be an input device that allows the user to drag and drop graphical representations 51-54, such as a computer mouse or a touchscreen.

As is known from computer operating systems, one or more graphical representations 51-54 may be dragged and dropped at the same time. For example, first a plurality of graphical representations 51-54 is marked by "drawing a box" with the input device around them, and then the marked group of graphical representations 51-54 may, as one composite object, be dragged and dropped onto one of the first, second or third regions A1, A2 or A3 to assign the whole group to that region A1, A2 or A3.

Figure 3:
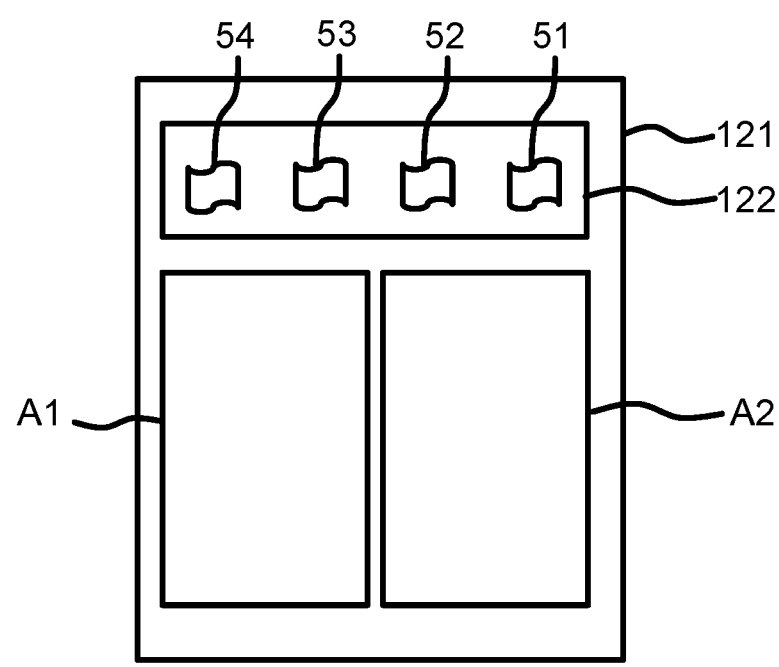

FIG. 3 shows an exemplary GUI 121 displayed by the display 120 (not shown) with a print job window 122 comprising four graphical representations 51-54 of print jobs, and a first region A1 and a second region A2 displayed as visible to the user. The first, second and third regions A1, A2 and A3 are defined as shown in FIG. 2. In other words, not all regions A1, A2 and A3 that have been defined in the GUI 121 have to be displayed as visible to the user as such. In FIG. 3, the region A3 is not, or not always, visibly displayed to the user.

Figure 4:
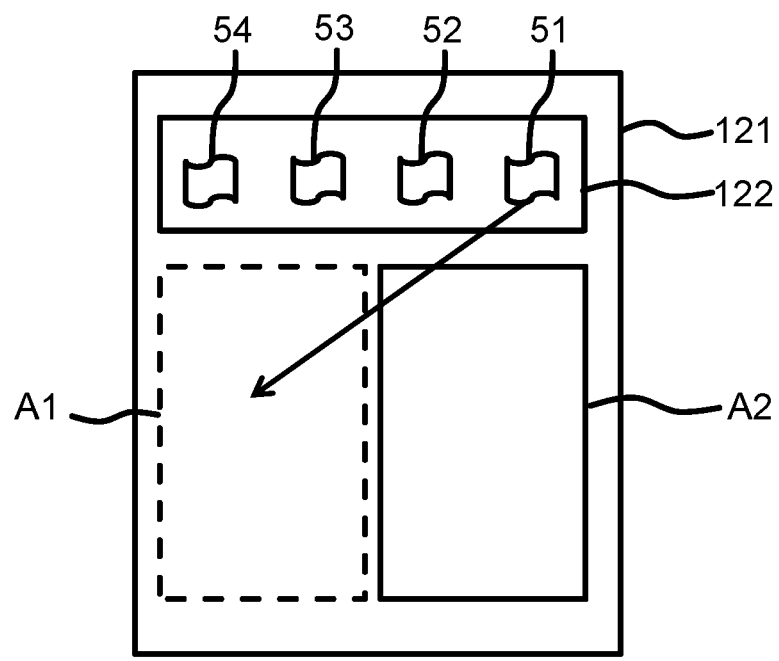
Figure 5:
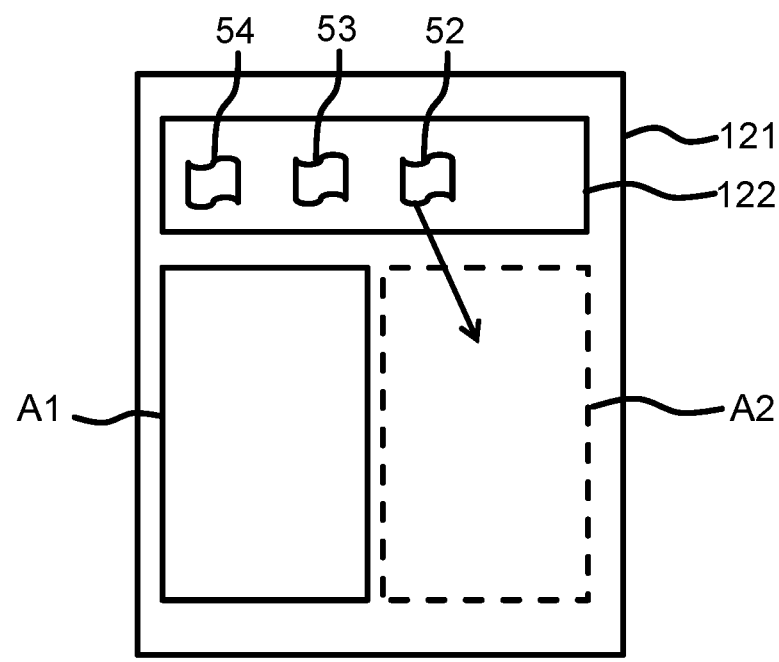
Figure 6:
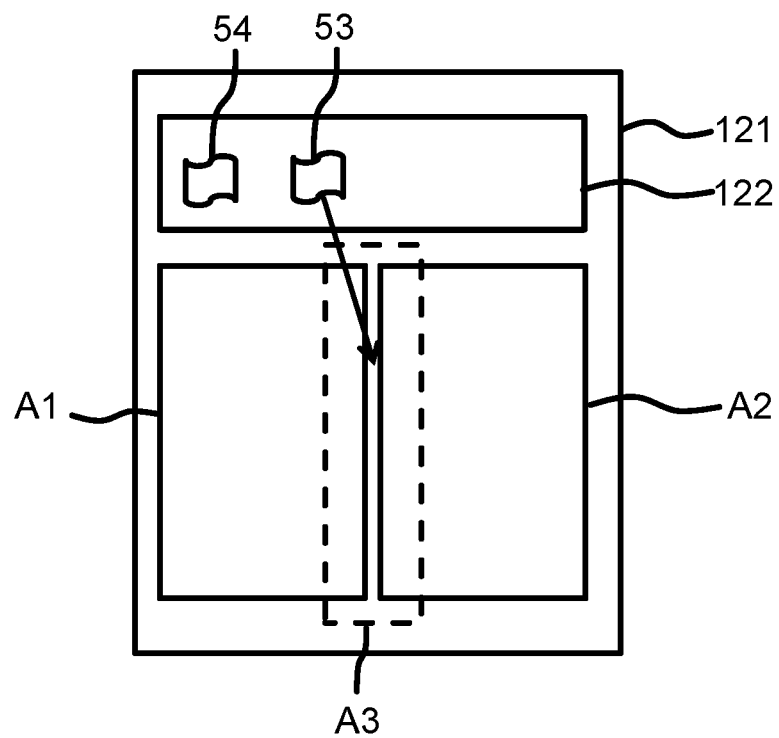
Figure 7:
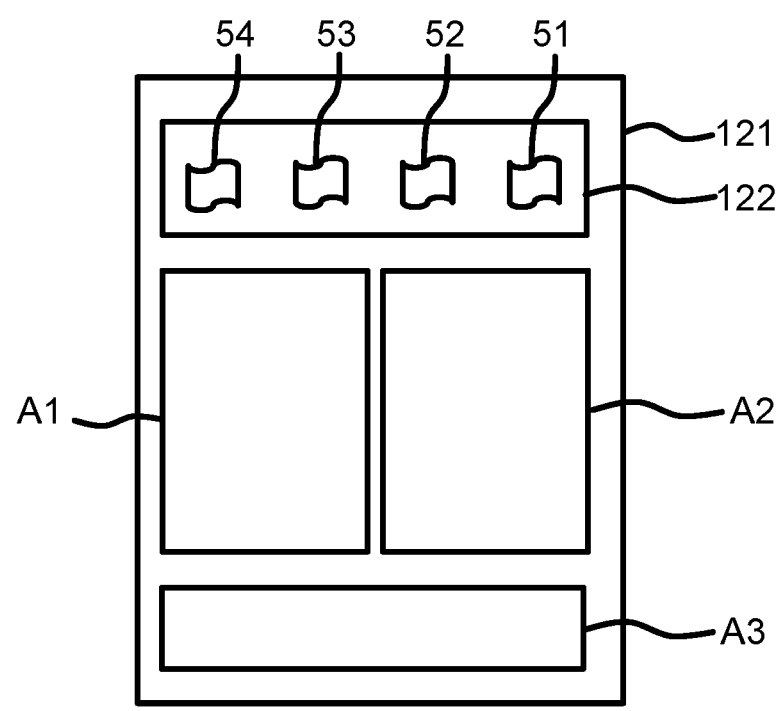

With respect to FIG. 4 to FIG. 6, exemplary functions of the controller 100 using the GUI 121 shown in FIG. 3 are described.

In FIG. 4 it is illustrated that a user assigns a first graphical representation 51 of a first print job, on the far right of the print job window 122, to the first region A1, e.g. by dragging and dropping said graphical representation 51 onto the first region A1.

Alternatively, for example, the user may be able to draw, using the user interface 130, lines between the first graphical representations 51 of the print jobs and the first region A1, second region A2 and third region A3 in order to assign the graphical representation 51 to the region A1, A2, A3 to which it is connected by a drawn line. According to yet another variant, the GUI may be designed such that the areas A1, A2, A3 themselves are dragged and dropped over to the graphical representations 51-54 of the print jobs.

FIG. 4 also illustrates by dashed lines that, advantageously, the first region A1 changes its appearance when a graphical representation 51 is assigned to it, e.g. when the graphical representation 51 is dragged over the first region A1. The change of appearance, illustrated in FIG. 4 by the dashed line of first region A1, may e.g. comprise highlighting the first region A1, changing a color with which it is displayed by the display 120, drawing a special border around the first region A1, and so on. After the first graphical representation 51 is assigned to the first region A1, the first graphical representation 51 may be removed from the print job window 122. Accordingly, in FIG. 5, which shows a point in time after a point in time shown in FIG. 4, the graphical representation 51 is no longer present in the print job window 122.

As a result of said graphical representation 51 being assigned to the first region A1, the print job represented by said graphical representation 51 is assigned to the first roll R1. In other words, because the graphical representation 51 has been assigned to the first region A1, the controller 100 controls the roll-to-roll printer 200 to print the print job represented by said graphical representation 51 onto the first roll R1, i.e. the controller 100 controls the roll-to-roll printer 200 to process said print job with the first roll processing path 201.

The assignment of the print job to the rolls R1, R2 (or, equivalently, to the roll processing paths 201, 202), is performed by an assignment logic 140 of the controller 100. The assignment logic may be implemented as pure hardware, i.e. comprising transistors, logic gates and other circuitry. Additionally, the assignment logic may be partially realized in terms of software. As such, the assignment logic may comprise a processor and a memory storing a software or a firmware that is executed by the processor. Signals may be received by an input interface of the assignment logic 140 and signals that the processor of the assignment logic creates may be outputted by an output interface of the assignment logic.

The assignment logic 140 may be realized in hardware, such as a circuit or a printed circuit board and/or comprising transistors, logic gates and other circuitry. Additionally, the assignment logic 140 may be at least partially realized in terms of software. Accordingly, the assignment logic 140 may comprise, or be operatively coupled to, a processor and a memory storing a software or a firmware that is executed by the processor to perform the functions of the assignment logic 140. Signals may be received by an input interface of the assignment logic 140 and signals that the processor of the assignment logic 140 creates may be outputted by an output interface of the assignment logic 140. The assignment logic 140 may be implemented, at least partially, as a microcontroller, an ASIC, an FPGA and so on.

The assignment logic 140 creates an output signal 74 which indicates the assignment of a print job to a specific roll R1, R2 (or, equivalently, to a specific roll processing path 201, 202). The output signal 74 may comprise the respective print job itself. Accordingly, the assignment logic 140 may receive the print jobs from the data interface 110 and an assignment signal 75 from the display 120 that indicates to which area A1, A2, A3 that print job has been assigned by the user.

Alternatively, the output signal 74 may be configured to enable the roll-to-roll printer 200 to uniquely identify the print job (which may be transmitted to the roll-to-roll printer 200 by other channels) being assigned by the output signal 74. The assignment logic 140 may, in this case, receive in the assignment signal 75 from the display 120 a unique print job identifier (such as a file name, an alphanumerical code etc.) together with the information to which area A1, A2, A3 that job has been assigned.

The assignment logic 140 may comprise an internal assignment logic output interface for outputting the output signal 74. The controller 100 may comprises an output interface 150 configured to receive the output signal 74 from the internal assignment logic output interface and to transmit the output signal 74 to the roll-to-roll printer 200. The output interface 150 may be realized as a cable-bound interface and/or as a wireless interface.

It will be appreciated that several elements of the controller 100, in particular the display 120, the user interface 130 and/or the assignment logic 140 may be integrated with one another and/or share a processor and one or more memory structures.

The controller 100 may be configured such that the images of the print job are simply marked one after the other on the first roll R1. Alternatively, the images of the print job may be arranged according to an algorithm on the first roll R1. For example, the images of the first print job may be nested with one another and/or with other images of previous print jobs assigned to the same roll.

Nesting in this context means taking a plurality of individual images and arranging at least some of them side-by-side in a direction perpendicular to the direction the roll of recording medium is moving. In addition, gaps left by e.g. some larger images on the recording medium roll may be filled by one or more smaller individual images, thus reducing the amount of recording medium used for printing the larger and the smaller images compared to printing them one after the other along the recording medium roll.

Nesting therefore contributes to reduce the amount of the recording medium needed by fully utilizing both the length of the recording medium (along the direction the recording medium is moving) and the breadth of the recording medium (perpendicular to that direction of moving).

In a following step, illustrated in FIG. 5, the user may then assign a second print job represented by a second graphical representation 52 to the second region A2. The assigning of the second graphical representation 52 to the second region A2 may be performed in the same ways as has been described with respect to the first graphical representation 51 and the first region A1, respectively.

Similarly, the result of assigning the second graphical representation 52 to the second region A2 is, with respect to the second roll R2, the same as the result of assigning the first graphical representation 51 to the first region A1. In other words: as a result of said second graphical representation 52 being assigned to the second region A2, the print job represented by said second graphical representation 52 is assigned to the second roll R2. Or, said in yet another way, because the second graphical representation 52 has been assigned to the second region A2, the controller 100 controls the roll-to-roll printer 200 to print the print job represented by said second graphical representation 52 onto the second roll R2, i.e. the controller 100 controls the roll-to-roll printer 200 to process said second print job with the second roll processing path 202.

Also in FIG. 5 it is indicated by dashed lines that the second region A2 changes its appearance when the second graphical representation 52 is assigned to the second region A2.

Again, after the second graphical representation 52 has been assigned to the second region A2, the second graphical representation 52 may be removed from the print job window 122. Accordingly, in FIG. 6, which shows a point in time after the point in time shown in FIG. 5, the graphical representation 52 is no longer present in the print job window 122.

In the steps described so far with respect to FIG. 4 and FIG. 5, all images of the first print job have been assigned to be processed by the first roll processing path 201 of the roll-to-roll printer 200, and all images of the second print job have been assigned to be processed by the second roll processing path 202 of the roll-to-roll printer 200.

It will have been noted that so far, the third region A3 has still not been made visible to the user. This is advantageous, since the user will be aware that there are two rolls R1, R2, processed each by a respective roll processing path 201, 202.

Accordingly, it will be quite clear and intuitive to the user that there are two large areas A1, A2 visible in the GUI 121 that enable the user to assign the print jobs to either one of these two rolls R1, R2.

However, FIG. 6 now shows a situation in which the user wants to assign a third print job represented by a third graphical representation 53. The user in this case does not want to decide to assign the third print job either to the first or the second roll R1, R2. The reason may be that the user does not care either way, that the user is unsure which roll processing path 201, 202 will be better suited (or even exclusively suited) to process that print job.

Another reason may be that the third print job comprises a large number of individual images, and the user does not want that all images of the third print job are assigned to one and the same roll R1, R2. In that case, the user may assign the third graphical representation 53 to the third region A3, as illustrated in FIG. 6. When the third graphical representation 53 is assigned to the third region A3 (e.g. by drag-and-drop as described above), the third region A3 changes its appearance. In the preferred variant in which the third region A3 is not usually visible to the user, that change in appearance includes that the third region A3 is now made visible to the user as indicated in FIG. 6.

The position of the third region A3 in between the first region A1 and the second region A2 clearly and intuitively indicates to the user that assigning the graphical representation 53 to the third region A3 means that some images of the third print job may be assigned to the first roll R1 and/or some images of the third print job may be assigned to the second roll R2.

This is because the assignment logic 140 is configured to determine, as a result of the third graphical representation 53 representing the third print job being assigned to the third region A3, for each image of the third print job the first roll R1 and/or the second roll R2, and to assign each image to the respective roll R1, R2 chosen for that image. For example, the images may be alternatingly assigned to the first roll R1 and the second roll R2 such that roughly half of the images of the third print job are assigned to the first roll R1 and half of the images of the third print job are assigned to the second roll R2. For example, if a specific print job comprises one image and instructions for it to be printed 100 times, this may be interpreted as the print job having 100 individual images which happen to be identical. Of these 100 images then exactly 50 images may be assigned to the first roll R1 and to the second roll R2 each.

Preferably, the assignment logic 140 is configured to choose for each image either the first roll R1 or the second roll R2 of the roll roll-to-roll printer 200 based on data comprised in the print job to which each individual image belongs and/or based on properties of the first and second rolls R1, R2 of the roll-to-roll printer 200.

The data comprised in the print job may, for example, include data about the dimensions of each image. In a roll-to-roll printer 200 in which the rolls R1, R2 have different dimensions, only one of the rolls R1, R2 may be suited for printing images with a width over a certain threshold such that these images are always assigned to that suited roll R1, R2. Properties of the first and second rolls R1, R2 may comprise, for example, data about the recording medium of the rolls, e.g. whether it is a matte or a glossy paper, whether the recording medium supports a certain high resolution, and so on. When the data comprised in the print job, for example, indicate that images have to be printed with a high resolution that is only supported by one of the rolls R1, R2 of the roll-to-roll printer 200, then, again, those images are assigned to that roll R1, R2 by the assignment logic 140.

Data indicating properties of the rolls of the roll-to-roll printer 200 may be received, e.g., via an interface of the controller 100, e.g. the data interface 110. Alternatively, or additionally, such properties may be input by the user, e.g. via the user interface 130.

Figure 8:
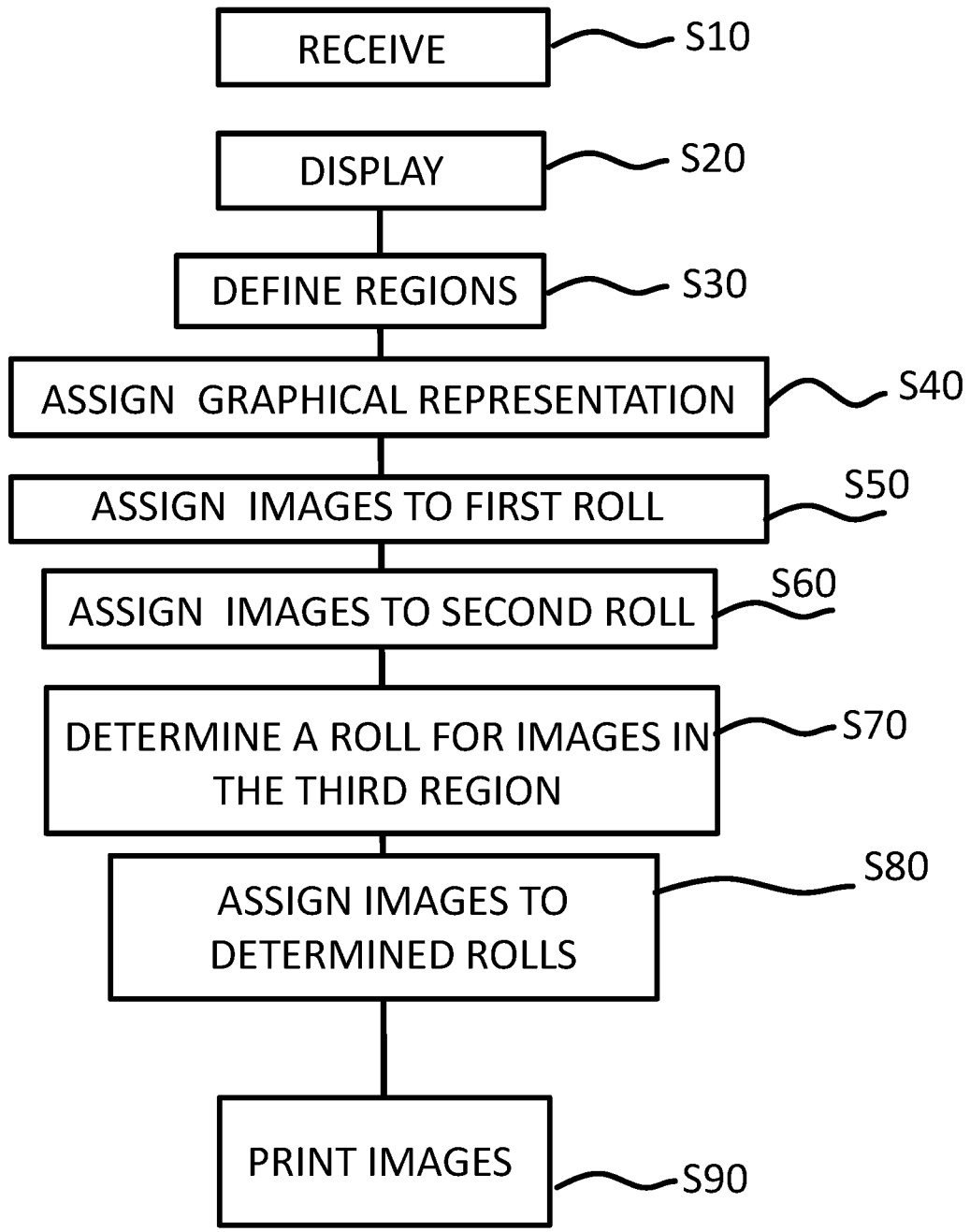
FIG. 8 shows a schematic flow diagram for illustrating a method according to an embodiment of the third aspect.

FIG. 8 shows a schematic flow diagram for illustrating a method according to an embodiment of the third aspect. The method of FIG. 8 serves for controlling a multi-roll printer configured to print on at least a first roll R1 of a recording medium and a second roll R2 of a recording medium. In particular, the method may serve to control a roll-fed printer, preferably a roll-to-roll printer. The method of FIG. 8 may be performed using the printing system 1000 described in the foregoing. Accordingly, the method of FIG. 8 described in the following may be modified and adapted according to all modifications and variations described with respect to embodiments of the first and second aspect in the foregoing, and vice versa.

To facilitate understanding, the method of FIG. 8 will be described using exemplary elements and reference signs used in the preceding figures. However, it will be understood that the method is not restricted to being performed with exactly those elements.

In a step S10, print jobs to be executed by the multi-roll printer 200 are received, wherein each print job comprises at least one image to be printed. For example, the print jobs may be received by a data interface 110 as described in the foregoing. The print jobs may, apart from the images themselves, comprise additional data such as parameter with which the individual images are to be printed and/or requirements about the rolls onto which the individual images are to be printed.

In a step S20, a GUI 121 with graphical representations 51-54 of the received print jobs is displayed, e.g. as has been described in the foregoing with respect to the display 120.

Specifically, in a step S30, a first region A1, a second region A2 and a third region A3 of, or in, the GUI 121 are defined, e.g. by a display controlling logic 123 of the display 120.

In a step S40, a user assigns the graphical representation 51-54 of at least one print job to any one of the first region A1, second region A2 and third region A3 of the GUI 121, for example as has been described in the foregoing with respect to the user interface 130. Preferably, the user may assign the graphical representation 51-54 to the first region A1, second region A2 or third region A3 using a drag-and-drop functionality.

In a step S50, all images of a print job are assigned automatically to the first roll R1 when the respective graphical representation 51-54 of that print job is assigned by the user to the first region A1.

In a step S60, all images of a print job are assigned automatically to the second roll R2 when the respective graphical representation 51-54 of that print job is assigned by the user to the second region A2.

Similarly, to steps S50 and S60, when the multi-roll printer 200 comprises more than two rolls R1, R2, it will be understood that additional steps will be performed when graphical representations are assigned to regions of the GUI 121 that correspond to those rolls in the same way as the first region A1 corresponds to the first roll R1 and as the second region A2 corresponds to the second roll R2.

The steps S50 and S60, as well as optional additional steps for optional additional rolls, may be performed as has been described with respect to the assignment logic 140 in the foregoing.

In a step S70, for each image of a print job assigned to the third region A3 by the user, at least one, or exactly one, of the rolls R1, R2 of the multi-roll printer 200 is determined automatically, for example as has been described with respect to the assignment logic 140 in the foregoing. In particular, the determining S70 may be based on data comprised in the print job to which each individual image belongs and/or based on properties of the first and second rolls R1, R2 of the roll-to-roll printer 200.

In a step S80, each image of the print job whose graphical representation has been assigned to the third region A3 by the user is to the respective roll R1, R2 determined in step S70 for that image, e.g. as has been described with respect to the assignment logic 140 in the foregoing.

In a step S90, each image of each print job is printed (or marked) onto the respective roll R1, R2 to which said image has been assigned, e.g. as has been described in the foregoing with respect to the roll-to-roll printer 200.

Figure 9:
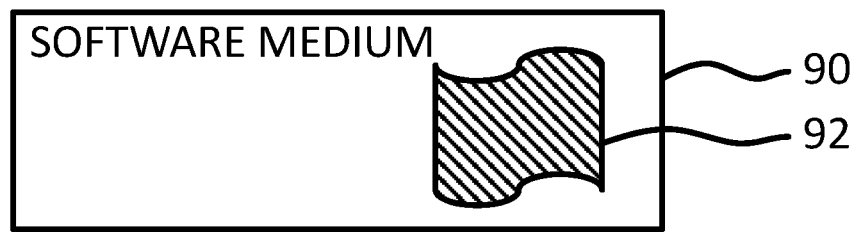
FIG. 9 schematically shows a software medium according to an embodiment of the fourth aspect.

FIG. 9 schematically shows a software medium 90 according to an embodiment of the fourth aspect. The software medium 90 comprises executable code 92 configured to, when executed, e.g. by a printing system 1000 and/or a controller 100, perform the method of the first aspect, e.g. as described with respect to the printing system 1000, the controller 100, or the method for controlling a roll-to-roll printer, according to any or all of the FIGS. 1 to 8 and/or according to any of the variants and modifications of the printing system 1000, the controller 100 and/or of the method described herein.

The software medium 90 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

One basic idea of the invention may be summarized as follows: a user may assign print jobs directly to one of the rolls R1, R2 of a multi-roll printer 200 by assigning graphical representations 51-54 of the print jobs to regions A1, A2 corresponding to those rolls R1, R2 in a GUI 121 corresponding to those rolls. The user may also assign print jobs to a region A3 in the GUI 121 that is not associated with any particular roll R1, R2, as a result of which each image of said print job is individually assigned automatically to at least one of the rolls R1, R2.

The invention claimed is:

1. A controller for a multi-roll printer configured to print on at least a first roll of a medium and a second roll of a medium at the same time, the controller comprising:
a data interface configured to receive print jobs to be executed by the multi-roll printer, each print job comprising at least one image to be printed;
a display configured to display a graphical user interface, GUI, with graphical representations of the print jobs received by the data interface, wherein a first region, a second region and a third region are defined within the GUI;
a user interface which allows a user to assign the graphical representation of any print job of the received print jobs to any one of the first, second and third region of the GUI;
an assignment logic configured to assign all images of a print job to the first roll when the respective graphical representation of that print job has been assigned by the user to the first region;
wherein the assignment logic is further configured to assign all images of a print job to the second roll when the respective graphical representation of that print job has been assigned by the user to the second region; and
wherein the assignment logic is further configured to determine, for each image of a print job whose graphical representation has been assigned to the third region by the user, one of the rolls of the multi-roll printer and to assign each image to the respective roll chosen for that image.

2. The controller according to claim 1,
wherein the user interface allows a user to move the graphical representations of the print jobs within the GUI;
wherein the user interface is configured to assign a print job to the first region, the second region or the third region when the graphical representation of that print job is dragged to and dropped onto the first region, the second region or the third region, respectively.

3. The controller according to claim 2,
wherein the display is configured to change the appearance of the first, second or third region of the GUI when the graphical representation of a print job is dragged onto, or moved over, or brought into contact with, the first, second or third region of the GUI, respectively.

4. The controller according to claim 2,
wherein the display is configured to graphically indicate the third region in the GUI to the user only when the graphical representation of a print job is dragged onto, or moved over, or brought into contact with, the third region of the GUI.

5. The controller according to claim 2,
wherein the display is configured to display the GUI such that the third region is arranged between the first and the second region.

6. The controller according to claim 2,
wherein the display is configured to indicate both the first and the second region to the user in the GUI when the graphical representation of a print job is dragged onto, or moved over, or brought into contact with, the third region of the GUI.

7. The controller according to claim 1,
wherein the third region is defined such that it does not overlap with either the first region or the second region.

8. The controller according to claim 1,
wherein the assignment logic is configured to choose for each image one of the rolls of the multi-roll printer based on data comprised in the print job to which the image belongs and/or based on properties of rolls of the multi-roll printer.

9. A printing system comprising a multi-roll printer and a controller according to claim 1.

10. The printing system of claim 9, wherein a print head of the multi-roll printer is configured to print on both the first roll and the second roll.

11. A method for controlling a multi-roll printer configured to print on at least a first roll of a medium and a second roll of a medium at the same time, the method comprising the steps of:
receiving print jobs to be executed by the multi-roll printer, each print job comprising at least one image to be printed;
displaying a GUI with graphical representations of the received print jobs;
defining a first region, a second region and a third region of the GUI;
assigning, by a user, the graphical representation of at least one print job to any one of the first, second and third region of the GUI;
assigning all images of a print job automatically to the first roll when the respective graphical representation of that print job has been assigned by the user to the first region;
assigning all images of a print job to the second roll when the respective graphical representation of that print job has been assigned by the user to the second region; and
determining automatically, for each image of a print job whose graphical representation has been assigned to the third region by the user, one of the rolls of the multi-roll printer;
assigning each image of the print job whose graphical representation has been assigned to the third region by the user to the respective roll determined for that image; and
printing each image of each print job onto the respective roll to which said image has been assigned.

12. The method of claim 11,
wherein the graphical representations of the print jobs are assigned to the first, second or third region by dragging and dropping the graphical representations onto the respective zone.

13. The method of claim 11,
wherein the appearance of the first, second or third region of the GUI is changed when the graphical representation of a print job is dragged onto, or moved over, or brought into contact with, the first, second or third region of the GUI, respectively.

14. The method of claim 11,
wherein the third region in the GUI is graphically indicated to the user only when the graphical representation of a print job is dragged onto, or moved over, or brought into contact with, the third region of the GUI.

15. A non-transitory software medium comprising executable program code configured to, when executed, perform the method according to claim 11.

* * * * *